Feb. 25, 1958 K. D. SMITH 2,824,975
ELECTRO-OPTICAL SYSTEM
Filed April 5, 1944 2 Sheets-Sheet 1
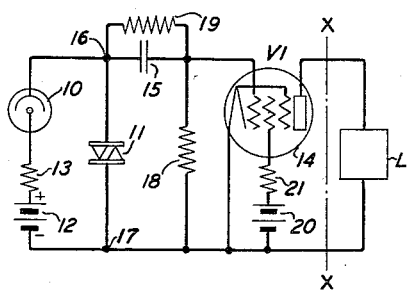
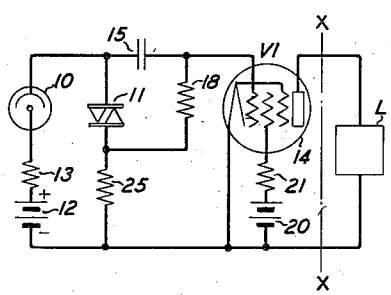
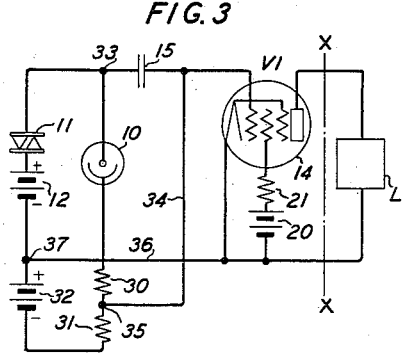
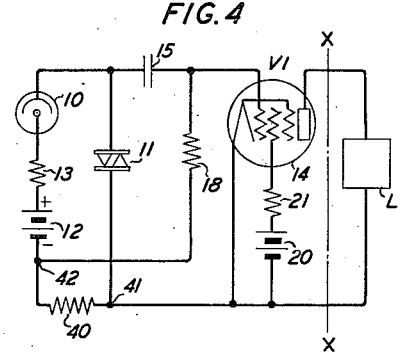
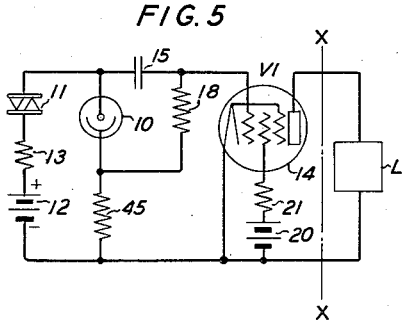
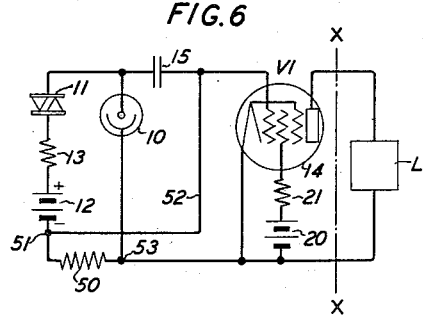
INVENTOR
K. D. SMITH
BY
Stanley B. Kent
ATTORNEY Feb. 25, 1958 K. D. SMITH 2,824,975
ELECTRO-OPTICAL SYSTEM
Filed April 5, 1944 2 Sheets-Sheet 2
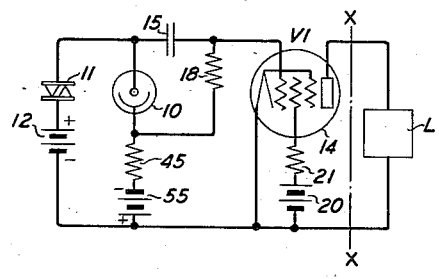
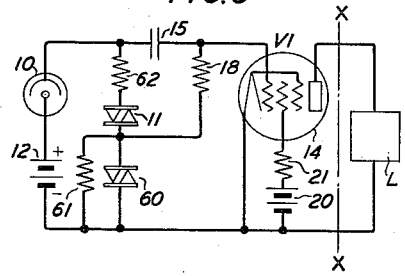
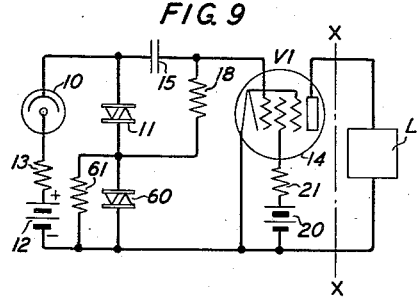
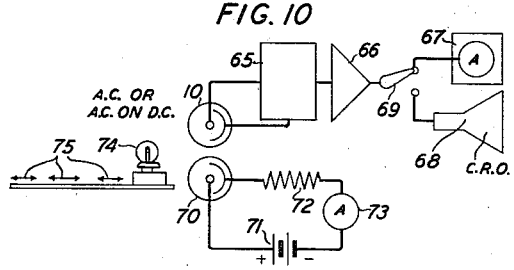
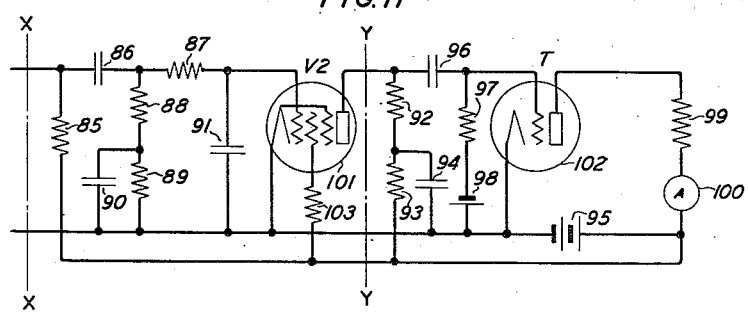
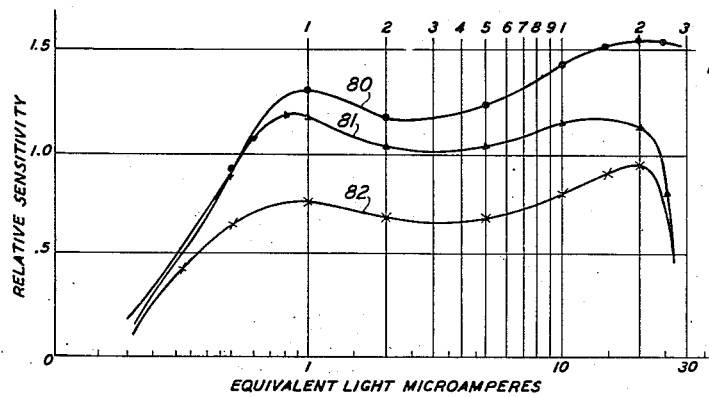
INVENTOR
K. D. SMITH
BY
Stanley B. Kent
ATTORNEY

United States Patent Office 2,824,975
Patented Feb. 25, 1958

2,824,975

ELECTRO-OPTICAL SYSTEM

Kenneth D. Smith, White Plains, N. Y., assignor to Bell Telephone Laboratories, Incorporated, New York, N. Y., a corporation of New York Application April 5, 1944, Serial No. 529,639

19 Claims. (Cl. 250—214)

This invention relates to transducer systems and more particularly to electro-optical systems.

An object of the invention is to provide an improved transducer system, for example an electro-optical system, having a nearly constant percentage sensitivity, that is, a system in which the output voltage is nearly proportional to the percentage modulation of a modulated static condition but is independent of the magnitude of the static condition.

In order to attain this object, one or more non-linear resistive elements in a series circuit with a light sensitive electric device are used to control an amplifier which is variably biased in accordance with the current in the series circuit under different static light conditions. In an example of practice of this invention a vacuum tube amplifier which is condenser-coupled across one or more of the elements of a circuit comprising a photoelectric cell, a source of direct current and a varistor connected in series is biased by means of a high resistance connected in shunt to the coupling condenser. The bias of the amplifier in this arrangement is dependent upon the current in the series circuit under different static light conditions.

Subject-matter divided from this application is disclosed and claimed in application Serial No. 608,702, filed August 3, 1945, for Electro-Optical System.

Other illustrative embodiments of this invention will be described hereinafter.

A varistor, as the term is used herein, is a non-linear resistance device which may assume a variety of forms but is always a conductive or semi-conductive device, never an electron emissive device. Varistor elements suitable for use in embodiments of this invention are discs of a semi-ceramic material composed of silicon carbide, clay and carbon pressed and fired. A characteristic of such a device is that the resistance is a non-linear function of the current flowing in the device. The impedance at any given voltage is inversely proportional to the area of the disc. Therefore, almost any desired operating impedance may be realized by a choice of area of the varistor disc. This type of varistor, its composition and method of manufacture are described in McEachron Patent 1,822,742, issued September 8, 1931.

One use to which this invention is adapted is to detonate the explosive charge of a projectile as it moves into proximity to a target due to a reduction in the illumination of the photoelectric cell. The normal or static illumination may be large or small, but for any given percentage reduction in the illumination the sensitivity remains practically constant. Thus, as the projectile moves past the target, which may be an airplane, a certain percentage of the illumination of the photoelectric cell is cut off at a given rate dependent upon the speed of the projectile and the nature of the airplane. However, the sensitivity of the detonating unit remains reasonably constant, no matter what the absolute intensity of the illumination may be.

Another use for this invention is in the measurement of percentage modulation of a light beam for a wide range of values of static light. In any arrangement where the change in output voltage is constant for a given percentage reduction in light anywhere within the working range of light variation, that arrangement may be used to measure percentage modulation within that light range by utilizing a peak-to-peak meter energized by the alternating current component of the voltage produced by energizing the photoelectric cell with modulated light and calibrated in terms of percentage modulation. For light modulated at any constant percentage the reading of the meter would remain constant for all average values of light within the operating range of light values. However, the meter reading would change if the percentage modulation of the light were changed.

A similar arrangement comprising a peak-to-peak meter may be utilized to indicate how nearly various arrangements of photoelectric cells, varistors and biasing resistors produce voltages which are proportional to the percentage modulation of the static light at various values of static light. For this purpose the percentage modulation is kept constant while the average value of the light is changed, changes in meter reading indicating departure from constant voltage response.

For best results, the peak-to-peak meter should be a vacuum tube meter which indicates peak-to-peak values of the impressed voltage for any wave shape of the impressed voltage. A cathode ray oscilloscope properly calibrated may be used as the indicating instrument. One source of modulated light is an ordinary filamentary electric lamp energized by 60-cycle alternating current. The percentage modulation of such a light may be varied by energizing the lamp with superimposed alternating current and direct current and varying the relative voltages of each. Many other sources of modulated light are known.

This invention will now be described more in detail having reference to the accompanying drawings:

Fig. 1 is a circuit embodying the invention in which the control electrode of a pentode amplifier is variably biased by the static voltage across a varistor by means of a high resistance connected between the grid and one terminal of the varistor in shunt of the coupling condenser;

Figs. 2 to 9 are modified circuits embodying the invention;

Fig. 10 is a diagrammatic illustration of an arrangement for determining the modulation of a source of light or the effectiveness of the circuits of Figs. 1 to 9;

Fig. 11 illustrates other load circuits suitable for use with the circuits of Figs. 1 to 9; and Fig. 12 shows the relationship between current in the photoelectric cell and relative sensitivity, that is, the relative change in load voltage for the same percentage change in illumination of the photoelectric cell in arrangements according to Figs. 8 and 9.

The same reference characters are used to indicate identical elements in the several figures of the drawings.

Referring now to Fig. 1, a photoelectric cell 10, a varistor 11, a battery 12 and a protective resistor 13 are connected together to form a closed series circuit. Coupled across the varistor 11 is an amplifier stage V1 to which amplifier stage is connected a load circuit L. The amplifier V1 comprises a pentode vacuum tube 14, the control grid of which is connected through a condenser 15 to terminal 16 of varistor 11. The cathode of pentode 14 is connected to the other terminal 17 of varistor 11. Connected between the grid and cathode of pentode 14 is a grid leak resistor 18. In order to provide a variable bias voltage for the control grid of pentode 14 according to this invention, a resistor 19 of relatively high resistance is connected between the control grid of pentode 14 and the terminal 16 of varistor 11. This bias voltage is proportional to the voltage drop across varistor 11 which in turn is a non-linear function of the illumination of the photoelectric cell 10. The screen grid of pentode 14 is energized by battery 20 through resistor 21. The load circuit L is connected between the plate and cathode of pentode 14.

If the voltage versus current characteristic of varistor 11 were exactly logarithmic and the amplifier stage V1 were exactly linear over the working range of illumination of the cell 10, the response obtained in the load circuit L for any given percentage change in illumination would remain constant for all values of static light within the working range without resorting to means to provide a variable bias such as the resistor 19 of Fig. 1. However, such circuit elements may be expensive or difficult to obtain so that a very real advantage results in the use of resistor 19 according to this invention with a varistor 11 and vacuum tube 14 which in themselves do not give the desired response.

In the circuit of Fig. 1, it should be noted that the input circuit of the amplifier stage V1 is coupled to the photoelectric cell and varistor series circuit by two paths, namely, an alternating current path through condenser 15 and a direct current path through resistor 19. Such coupling is characteristic of this invention. The voltage supplied through the direct current path changes the impedance of the space path between the control grid and cathode, at least for some light values within the working range, so that the variation in output current or voltage is substantially constant for any given percentage change in illumination within the working range of light values. However the biasing voltage supplied through the direct current path may be used to modify the response in any other manner desired.

In the arrangement of Fig. 2 a resistor 25 is connected in series with the varistor 11 and the voltage drop across resistor 25 is impressed through grid leak resistor 18 on the grid of pentode 14. The voltage drop across resistor 25 is proportional to the illumination of photoelectric cell 10. The resistance of resistor 25 is so chosen that in cooperation with the variable impedance of the control grid to cathode space of pentode 14 it will compensate for the departure of the voltage drop across the varistor 11 from a logarithmic variation with respect to photoelectric current or illumination.

In the arrangement of Fig. 3 the series circuit comprising photoelectric cell 10, varistor 11 and battery 12, includes additional resistors 30 and 31 and a biasing battery 32. The control grid of pentode 14 is connected through condenser 15 to terminal 33 of photoelectric cell 10, the condenser 15 constituting an alternating current path between the photoelectric cell and varistor series circuit and the amplifier V1. The resistor 31 functions both as a grid leak for pentode 14 and as a source of variable biasing voltage by reason of the direct conductive connection 34 between terminal 35 of resistor 31 and the control grid of pentode 14. A direct conductive connection 36 connects the cathode of pentode 14 to the terminal 37 of battery 32. The connection 34 from the grid of pentode 14 to the terminal 35 is a direct current path from amplifier V1 to the photoelectric cell and varistor series circuit. The voltage drop across photoelectric cell 10 and resistor 30 is impressed on amplifier V1 through condenser 15. The resistor 30 modifies the voltage impressed on amplifier V1 by way of the alternating current path through condenser 15. By properly selecting the circuit elements in Fig. 3 and desired relationship may be obtained between light on the photoelectric cell 10 and current in the load circuit L. In this arrangement the biasing battery 32 aids the battery 12 in energizing the series circuit comprising the photoelectric cell 10 and varistor 11.

In the arrangement of Fig. 4 the amplifier V1 for alternating current is connected across the varistor 11 as in Fig. 1. For the direct current coupling the resistor 40 is inserted in the series circuit between the terminal 41 of varistor 11 and the negative terminal 42 of battery 12. The control grid of pentode 14 is connected through grid leak resistor 18 to the terminal 42 so that the voltage drop across resistor 40 places a variable negative bias on the control grid of pentode 14 with respect to the cathode of pentode 14.

The arrangement of Fig. 5 is much like that of Fig. 2 except that the photoelectric cell 10 and the varistor 11 have been interchanged. The biasing voltage for the grid of pentode 14 is supplied by resistor 45. This biasing voltage makes the grid positive with respect to the cathode and so changes the impedance in accordance with the current through the photoelectric cell 10.

In the arrangement of Fig. 6 the voltage drop across resistor 50 places a variable negative bias on the control grid of pentode 14 with respect to its cathode. The control grid of pentode 14 is conductively connected directly to terminal 51 of resistor 50 by conductor 52. The cathode of pentode 14 is connected to the terminal 53 of resistor 50. In this arrangement the voltage drop across the photoelectric cell 10 is impressed on the amplifier V1 through the alternating current path by way of condenser 15 and the variable biasing potential through the direct current path by way of conductor 52.

The arrangement of Fig. 7 is like that of Fig. 5 except that a biasing battery 55 is connected between the resistor 45 and the battery 12. Battery 55 aids the battery 12 with respect to the series circuit including the photoelectric cell 10 and varistor 11 but opposes the voltage drop across resistor 45 in determining the bias on the control grid of pentode 14. The battery 55 and resistor 45 may be so chosen as to cause grid current to flow for light values within only a portion of the range of working light values to control the impedance of the grid to cathode path of the pentode 14.

In the arrangements of Figs. 1 to 7, the resistors 19, 25, 30, 31, 40, 45 and 50 which provide a variable bias for the control grid of pentode 14 may be varistors under some conditions instead of fixed resistors. The response to be attained will determine the kind of varistor to be used.

In the arrangement of Fig. 8, a second varistor 60 shunted by fixed resistor 61 is used to furnish the variable biasing voltage for the control grid of pentode 14. A fixed resistor 62 is connected in series with varistor 11, the total voltage drop across varistor 11 and resistor 62 being impressed through condenser 15 on the control grid of pentode 14 superimposed on the variable biasing voltage supplied by varistor 60 and resistor 61.

In the arrangement of Fig. 9, a circuit similar to that of Fig. 8 is utilized, modified by omitting the resistor 62 and inserting the protective resistor 13.

An arrangement for utilizing the circuits of Figs. 1 to 9 is illustrated in Fig. 10. Box 65 and photoelectric cell 10 represent an arrangement like any one of those illustrated in Figs. 1 to 9 to the left of the line X—X. An audio amplifier 66 is connected as load in place of the load L to the right of line X—X in Figs. 1 to 9. A peak-to-peak voltmeter 67 the readings of which are indicated on an ammeter A or a cathode ray oscillograph 68 may be connected alternatively to the output of amplifier 66 by switch 69. A second photoelectric cell 70 is connected in series with a battery 71 and resistor 72 to a microammeter 73 the reading of which gives a measure of the average illumination of photoelectric cell 70. Photoelectric cells 10 and 70 are equally illuminated by light from an incandescent filament lamp 74 which may be positioned at different distances from the cells 10 and 70 as indicated by the double-headed arrows 75. The filament may be energized by 60 cycles alternating current or by 60 cycles alternating current superposed on direct current. The light produced by either type of energization is a modulated light, that is, a light of some average value varying cyclically in accordance with the wave shape of the energizing current.

The arrangement of Fig. 10 may be used in two ways, namely, first to determine the characteristic of the circuit represented by block 65 and second, to determine the percentage modulation of the light from lamp 74. When the circuit represented by the block 65 has such a characteristic that for equal percentage changes in the illumination of photoelectric cell 10 equal changes in output voltage result as indicated by meter A, assuming, of course, that the illumination falls within the working range of the illuminations of the arrangement, the meter A may be calibrated in terms of percentage modulation of the light and will show the percentage modulation of light from any source of light whether it be lamp 74 or some other source such as a lamp used for lighting a room or even daylight.

The graphs of Fig. 12 show the characteristics of the circuits of Figs. 8 and 9 for a given percentage modulation of the light as determined by the arrangement of Fig. 10. The illumination expressed in microamperes are the abscissas, being the readings of meter 73 for various positions of the lamp 74 and the numbers representing the relative sensitivity are the ordinates, being the readings of the meter A of peak-to-peak voltmeter 67 for corresponding positions of lamp 74. Graph 80 shows the characteristic sensitivity of the arrangement of Fig. 8 using a certain pair of varistors 11 and 60. Graph 81 shows the characteristic sensitivity of the arrangement of Fig. 9 using the same pair of varistors 11 and 60 as for the graph 80. Resistor 62 has been removed and the protective resistor 13 has been inserted, reducing the relative sensitivity somewhat but improving the "flatness" of the characteristic. Graph 82 also shows the characteristic sensitivity of the arrangement of Fig. 9 using a higher impedance element for varistor 11, the other elements being the same as for graph 81. The sensitivity for all the arrangements represented in Fig. 12 falls off at very low illuminations or current values. The sensitivity of the circuit of Fig. 9 also falls rapidly at very high illuminations or current values due to the protective fixed resistor 13. The data for the graphs of Fig. 12 were all obtained for the same percentage modulation of the light from source 74.

The circuit of Fig. 11 is another load circuit which may be substituted for the load L in any of the arrangements of Figs. 1 to 9. It comprises an amplifier stage V2 adapted to be connected to amplifier stage V1 of any of the arrangements of Figs. 1 to 9 and a thyratron stage T coupled to the output circuit of amplifier stage V2. The output circuit of amplifier stage V1 is coupled to the input circuit of amplifier stage V2 by resistor 85, series condenser 86, series grid resistor 87, grid leak resistors 88 and 89, shunting condenser 90 for resistor 89 and shunt grid condenser 91. The output circuit of amplifier stage V2 is coupled to the input circuit of thyratron stage T by resistors 92 and 93, condenser 94 shunting resistor 93 and battery 95, series condenser 96, grid leak resistor 97 and negative biasing grid battery 98. The output circuit of thyratron stage T comprises load resistor 99 in series with ammeter 100 and battery 95. Amplifier stage V2 includes a pentode vacuum tube 101 and thyratron stage T, a thyratron tube 102. The cathodes of tubes 14 and 101 and thyratron tube 102 are heated by current from a battery, not shown. The screen grid of pentode 101 is energized from battery 95 through resistor 103.

The portion of Fig. 11 to the right of line X—X may be connected to the portion to the left of line X—X in any of Figs. 1 to 9 to form various useful arrangements. Also in Fig. 11 the portion to the right of line Y—Y may be connected to the portion to the left of line X—X in any of Figs. 1 to 9 to form other useful arrangements. For example, if the portion of Fig. 11 to the right of line Y—Y is used with the portion to the left of line X—X of Fig. 1, an arrangement results which can be used to dentonate the explosive charge of a projectile as it moves into proximity to a target whereby the illumination of the photoelectric cell 10 is impulsively reduced. The reduction of light on the photoelectric cell 10 causes the grid of thyratron 102 to become less negative until the thyratron fires to heat the resistor 99. On the other hand, if the portion of Fig. 11 to the right of line X—X is used with the portion to the left of the line X—X of Fig. 1, an arrangement results in which an impulsive increase in the illumination of photoelectric cell 10 is necessary to fire the thyratron.

As an aid in practicing this invention certain construction data will now be given. This data is merely illustrative since the invention may be embodied in many forms differing widely from that given herein. In the arrangement of Fig. 9, for example, from which the data for graph 81 of Fig. 12 was obtained, certain elements are as follows:

| | |
|---|---|
| Photoelectric cell 10 | RCA C-7052 phototube. |
| Resistor 13 | 3 megohms. |
| Resistor 18 | 100 megohms. |
| Resistor 61 | 4 megohms. |
| Vacuum tube 14 | Hytron HY145XT. |
| Condenser 15 | 0.0005 microfarad. |
| Battery 12 | 90 volts. |

Varistor 11 is a non-linear resistor element made up of silicon carbide, clay and graphite after the manner disclosed in McEachron Patent 1,822,742. The ingredients are granulated and thoroughly mixed in the proportions of 60 parts of silicon carbide, 40 parts of clay, and 1 part of graphite. After wetting with water and being partially dried this material is pressed into discs and fired. Each disc has an outside diameter of ¾ of an inch, a thickness of .030 of an inch, and a central hole 9/32 of an inch in diameter. The faces only of each disc are coated with tin with a metalizing gun. Each completed disc has such a resistance that 20 volts applied between the tin coated faces produce current of between 10 and 3.3 milliamperes, and 10 volts applied in the same manner produce not less than 0.21 milliampere. This varistor is formed by dividing one disc into ten equal sectors and clamping five sectors face to face between copper electrodes. The resistance of this unit at one microampere is 22 megohms.

Varistor 60 is similar to varistor 11 except that the area of each of the five sectors is approximately twice that of the sectors comprising varistor 11.

What is claimed is:

1. An electro-optical system comprising a primary series circuit including a light sensitive electric device and a resistor, the resistance of said resistor changing in response to changes of illumination of said device, a vacuum tube amplifier including an input circuit and an output circuit, a coupling for alternating current components only between said series circuit and said input circuit, a conductive coupling including an impedance also between said series circuit and said input circuit, and a load circuit connected to said output circuit.

2. An electro-optical system including a primary closed series circuit comprising a light sensitive electric device, a varistor and a source of direct current, an amplifying circuit comprising an element the bias of which changes the amplifying ability of said amplifying circuit, a coupling circuit including a condenser for coupling an element of said primary circuit to said amplifier, and a high resistance connected across said condenser to change the bias on said amplifier when the static light condition changes.

3. A primary closed series circuit comprising a photoelectric cell, a varistor and a source of direct current, a vacuum tube amplifier comprising a cathode, an anode and a control electrode, a high resistance connected between said cathode and control electrode, a conductive connection from one terminal of said varistor to said cathode, a condenser connected between the other terminal of said varistor and said control electrode, a resistance connected in shunt of said condenser, and a load circuit connected to said anode and cathode.

4. A primary closed series circuit comprising a photoelectric cell, a varistor and a first resistor with the varistor connected between the photoelectric cell and the resistor, a vacuum tube amplifier comprising a cathode, an anode and a control electrode, a condenser connected between said control electrode and the terminal of said varistor nearer to said photoelectric cell, a high resistance resistor connected between said control electrode and the other terminal of said varistor, a conductive connection between the terminal of said first resistor remote from said varistor and said cathode, and a load circuit connected to said anode and cathode.

5. A primary closed series circuit comprising a photoelectric cell, a plurality of varistors, a resistor and a source of direct current, said resistor being connected to one terminal of one of said varistors and a second varistor being connected to the other terminal of said one varistor, a vacuum tube amplifier comprising a cathode, an anode and a control electrode, a condenser connected from the terminal of said resistor remote from said one varistor to said control electrode, a high resistance connected between the joined terminals of said two varistors and said control electrode, a conductive connection from the other terminal of said second varistor to said cathode, and a load circuit connected to said anode and cathode.

6. A primary closed series circuit comprising a photoelectric cell, a plurality of varistors, a resistor and a source of direct current, said resistor being connected to one terminal of one of said varistors and a second varistor being connected to the other terminal of said one varistor, a vacuum tube amplifier comprising a cathode, an anode and a control electrode, a condenser connected from the terminal of said resistor remote from said one varistor to said control electrode, a high resistance connected between the joined terminals of said two varistors and said control electrode, a conductive connection from the other terminal of said second varistor to said cathode, a second resistor connected in shunt of the terminals of said second varistor, and a load circuit connected to said anode and cathode.

7. A primary closed series circuit comprising a photoelectric cell, a plurality of varistors and a source of direct current, one terminal of one of said varistors being connected to one terminal of a second of said varistors, a vacuum tube amplifier comprising a cathode, an anode and a control electrode, a condenser connected between the terminal of said one varistor remote from said second varistor and said control electrode, a high resistance connected between the other terminal of said one varistor and said control electrode, a conductive connection between the terminal of said second varistor remote from said one varistor and said cathode, and a load circuit connected to said anode and cathode.

8. A primary closed series circuit comprising a photoelectric cell, a plurality of varistors and a source of direct current, one terminal of one of said varistors being connected to one terminal of a second of said varistors, a vacuum tube amplifier comprising a cathode, an anode and a control electrode, a condenser connected between the terminal of said one varistor remote from said second varistor and said control electrode, a high resistance connected between the other terminal of said one varistor and said control electrode, a conductive connection between the terminal of said second varistor remote from said one varistor and said cathode, a resistor connected in shunt of the terminals of said second varistor, and a load circuit connected to said anode and cathode.

9. An electro-optical system including a primary closed series circuit comprising a light sensitive electric device, a varistor and a source of direct current, an amplifying circuit comprising a bias element, the bias of which with respect to another element of said amplifying circuit changes the amplifying ability of said amplifying circuit, a circuit for alternating current components only coupling said amplifying circuit to said primary circuit, a conductive connection between said other element of said amplifying circuit and a first point of said primary circuit, a second conductive connection between said bias element and a second point of said primary circuit which is always positive with respect to said first point.

10. A transducer system, including a primary electric circuit comprising, in a closed series circuit, a current controller and a resistor, the resistance of said resistor changing in response to a change of current therein produced by the action of said current controller, an amplifying device having an input circuit and an output circuit, a coupling for alternating current components only between said series circuit and said input circuit, a conductive coupling also between said series circuit and said input circuit, and a load circuit connected to said output circuit.

11. An electro-optical system comprising a primary series circuit including a light-sensitive electric device and a resistor, the resistance of said resistor changing in response to changes of illumination of said device, a vacuum tube amplifier including an input circuit and an output circuit, a coupling for alternating current components only between said series circuit and said input circuit, a conductive coupling also between said series circuit and said input circuit, means to illuminate said light-sensitive electric device with modulated light, and means including a peak-to-peak meter connected to said output circuit.

12. An electro-optical system comprising a photoelectric cell, a vacuum tube amplifier having a cathode, an anode, and a control electrode, an input circuit for said amplifier including said cathode and control electrode, an output circuit for said amplifier including said cathode and anode, a coupling circuit for alternating current components only connected between said photoelectric cell and said input circuit including a varistor, means to change the direct current bias on said control electrode with respect to said cathode in accordance with changes in the voltage across said varistor resulting from changes in the illumination of said photoelectric cell, and a load circuit connected to the output circuit of said amplifier.

13. An electro-optical system comprising a photoelectric cell, a vacuum tube amplifier having a cathode, an anode, and a control electrode, an input circuit for said amplifier including said cathode and control electrode, an output circuit for said amplifier including said cathode and anode, a coupling circuit for alternating current components only connected between said photoelectric cell and said input circuit including a varistor, means to change the direct current bias on said control electrode with respect to said cathode in accordance with changes in the voltage across said varistor resulting from changes in the illumination of said photoelectric cell and including a leakage path of constant high resistance from said control electrode to said cathode, and a load circuit connected to the output circuit of said amplifier.

14. An electro-optical system comprising a series path including a photoelectric cell and a source of direct current therefore, a vacuum tube amplifier having a cathode, an anode and a grid, a condenser having one terminal connected to said grid and the other terminal connected to a terminal of said series path, a leakage path including a fixed resistance element having its terminals connected respectively directly to said grid and cathode, a varistor through which current from said source flows to control the potential drop between said common terminal of said condenser and series path and said cathode dependent upon the average illumination of said cell, and a load circuit connected between said anode and cathode.

15. An electro-optical system for determining the percentage modulation of the light from a source of modulated light comprising a light sensitive electric device adapted to be illuminated by modulated light, means to measure the peak-to-peak voltage of the alternating current component of an electric current produced by the said illumination of said light sensitive device, and means to measure the average value of the illumination of said device in terms of voltage units corresponding to said peak-to-peak voltage units.

16. An electro-optical system comprising a photoelectric cell, a vacuum tube amplifier having a cathode, an anode, and a control electrode, an input circuit for said amplifier including said cathode and control electrode, an output circuit for said amplifier including said cathode and anode, a coupling circuit for alternating current components only connected between said photoelectric cell and said input circuit including a varistor, means to change the direct current bias on said control electrode with respect to said cathode in accordance with changes in the voltage across said varistor resulting from changes in the illumination of said photoelectric cell, means to measure the peak-to-peak voltage of the alternating current component in the output circuit of said amplifier resulting from the illumination of said photoelectric cell, and means to measure the average value of the illumination of said photoelectric cell in terms of voltage units corresponding to said peak-to-peak voltage units.

17. An electro-optical system for determining the percentage modulation of the light from a source of modulated light comprising a primary closed series circuit including a photoelectric cell, a varistor and a source of direct current, a vacuum tube amplifier comprising a cathode, an anode and a control electrode, a high resistance connected between said cathode and control electrode, a conductive connection from one terminal of said varistor to said cathode, a condenser connected between the other terminal of said varistor and said control electrode, a resistance connected in shunt of said condenser, means connected to said anode and cathode to measure the peak-to-peak voltage of the alternating current component of an electric current resulting from the illumination of said device, and means to measure the average value of the illumination of said device in terms of voltage units corresponding to said peak-to-peak voltage units.

18. An electro-optical system for determining the percentage modulation of the light from a source of modulated light comprising a primary closed series circuit including a photoelectric cell, a plurality of varistors, a resistor and a source of direct current, said resistor being connected to one terminal of one of said varistors and a second varistor being connected to the other terminal of said one varistor, a vacuum tube amplifier comprising a cathode, an anode and a control electrode, a condenser connected from the terminal of said resistor, remote from said one varistor to said control electrode, a high resistance connected between the joined terminals of said two varistors and said control electrode, a conductive connection from the other terminal of said second varistor to said cathode, a second resistor connected in shunt of the terminals of said second varistor, means to measure the peak-to-peak voltage of the alternating current component of an electric current resulting from the illumination of said photoelectric cell, and means to measure the average value of the illumination of said photoelectric cell in terms of voltage units corresponding to said peak-to-peak voltage units.

19. An electro-optical system for determining the percentage modulation of the light from a source of modulated light comprising a primary closed series circuit including a photoelectric cell, a plurality of varistors, and a source of direct current, one terminal of one of said varistors being connected to one terminal of a second of said varistors, a vacuum tube amplifier comprising a cathode, an anode, and a control electrode, a condenser connected between the terminal of said one varistor remote from said second varistor and said control electrode, a high resistance connected between the other terminal of said one varistor and said control electrode, a conductive connection between the terminal of said second varistor remote from said one varistor and said cathode, a resistor connected in shunt of the terminals of said second varistor, means to measure the peak-to-peak voltage of the alternating current component of an electric current resulting from the illumination of said photoelectric cell, and means to measure the average value of the illumination of said device in terms of voltage units corresponding to said peak-to-peak voltage units.

References Cited in the file of this patent

UNITED STATES PATENTS

| 1,313,187 | Hull | Aug. 12, 1919 |
| 1,415,748 | Weintraub | May 9, 1922 |
| 1,650,092 | Poulsen et al. | Nov. 22, 1927 |
| 1,832,707 | Hull | Nov. 17, 1931 |
| 1,864,670 | Reynolds | June 28, 1932 |
| 1,889,758 | Nakken | Dec. 6, 1932 |
| 2,203,882 | Shore | June 11, 1940 |
| 2,219,189 | Lundstrom | Oct. 22, 1940 |
| 2,360,233 | Hussey | Oct. 10, 1944 |

OTHER REFERENCES

Article by John Russel, vol. 8, pp. 495–6, "Rev. of Scien. Instr." for December 1937.

Thermistors in Electronic Circuits-Electronic Industries, January 1945, pages 76–80. (Copy in Div. 54.)